United States Patent [19]

Hamilton

[11] Patent Number: 5,113,124
[45] Date of Patent: May 12, 1992

[54] PROGRAMMABLE APPLIANCE CONTROLLER

[75] Inventors: Martin W. Hamilton, Arlington Heights, Ill.; Michael Baran, Wauwatosa; Todd King, Cedarburg; Denis Leveque, Milwaukee, all of Wis.

[73] Assignee: Eaton Corporation, Cleveland, Ohio

[21] Appl. No.: 576,756

[22] Filed: Sep. 4, 1990

[51] Int. Cl.⁵ .................................... G05B 19/06
[52] U.S. Cl. ............................ 318/578; 318/452; 200/37 A; 200/38 B; 200/27 B
[58] Field of Search .............. 200/35, 37, 27 B, 36, 200/38; 318/578, 466, 452; 307/141, 141.4, 141.8

[56] References Cited

U.S. PATENT DOCUMENTS

| | | | |
|---|---|---|---|
| 3,603,961 | 2/1969 | Duris et al. | 340/309.4 |
| 3,707,856 | 1/1973 | Niewyk et al. | 68/12 R |
| 3,947,790 | 3/1976 | Harris | 300/381.2 |
| 4,041,424 | 8/1977 | Harris | 200/38 F |
| 4,187,499 | 2/1980 | Scheer | 340/309.1 |
| 4,521,727 | 6/1985 | Barthel et al. | 200/38 B |
| 4,523,062 | 6/1985 | Mahon | 200/35 R |
| 4,616,209 | 10/1986 | Mahon | 200/35 R |
| 4,629,854 | 12/1986 | Mahon | 200/35 R |
| 4,678,930 | 7/1987 | Mahon | 200/38 R |

Primary Examiner—William M. Shoop, Jr.
Assistant Examiner—David Martin
Attorney, Agent, or Firm—R. A. Johnston

[57] ABSTRACT

A programmer for an appliance having a line power switch and a plurality of program switches sequentially actuated by a cyclic cam mechanism. The program switches are latched to the actuated condition and uplatched independently of the cyclic mechanism by electrically energized release mechanisms, individually controlled by an electronic controller having a microcomputer which employs a user selected programmed sequence.

13 Claims, 3 Drawing Sheets

PROGRAMMABLE APPLIANCE CONTROLLER

BACKGROUND OF THE INVENTION

The present invention relates to program controllers or programmers, as they are sometimes called, which are employed for sequentially actuating a plurality of switches for controlling various functions of an appliance or other device to be controlled. Controllers of this type are commonly employed for household appliances, such as dishwashers, clothes washing machines, clothes dryers, and cooking appliances. Typically, a subfractional horsepower timing motor drives an advance mechanism for effecting rotation of a cam drum; and, individual tracks on the cam drum sequentially actuate and deactuate program function control switches as the cam drum is rotated through a complete revolution which comprises the desired program cycle.

In applications where a rotatable cam drum is employed for programming the actuation and deactuation of the appliance control switches, the degree of sophistication of sequencing the switches is limited by the configuration of the cam and the rate of advance of the cam. Therefore, it has been desired to find alternative ways of controlling the program function switches in an appliance to avoid the limitations of a sequentially advanced cam track.

In attempting to overcome such limitations, appliance programmers having solid state electronic switching devices have been employed. However, such switching devices have required the use of relays where switching of heavy current is required for controlling motor starting and other functions requiring a substantial current draw. In addition, the cost of providing such components to the appliance programmer or controller has rendered the electronic controller noncompetitive against equivalent electromechanical programmers in high volume mass produced household appliances is.

Thus, a need has arisen for finding a way or means of controlling the program sequence of appliance functions in a manner which can provide for the switching of substantial current as, for example, the starting current for a main drive motor, and yet provide for a programmed sequence control which is not limited by the positioning of sequentially advanced cams on a rotating cam drum. It has thus been desired to employ the sophistication and the variety of control sequence programming available from a programmed microcomputer or microprocessor, which can provide for control of the appliance functions independently of a timed rate of rotation of a cam.

Accordingly, it has been desired to find a technique or a way of providing a plurality of individual switches for controlling selected appliance functions which draw substantial current and to control the sequence or program of operation of such functions with a microcomputer. It has further been desired to provide such programmed controlling in a manner which is low enough in cost to enable the resultant programmer to be used in mass produced household appliances which are sold in a highly competitive marketplace.

SUMMARY OF THE INVENTION

The present invention provides an appliance programmable controller which utilizes a cyclically operated mechanism such as a rotating cam drum for causing actuation of a plurality of appliance function switches and a line power switch. The first revolution of the cam drum causes the program switches to be latched to the actuated condition such that subsequent revolutions of the cam do not affect the condition of the switches. The latches for the program switches are individually released by separate electrically energized release mechanisms which are controlled by circuitry including a microcomputer having the desired program sequence for the appliance programmed therein. The microcomputer may contain alternative program sequences which are selectable by a user selected control input to the microcomputer.

The present invention provides a combination, or hybrid, programmable controller for an appliance utilizing cam actuated program switches which are initially latched to the actuated condition by rotation of the cam and electrically unlatched only by a circuit controlled by a microcomputer. The present invention thus enables the program sequencing of the appliance control function switches to be independent of the timed rotation of the cam which acts merely as a relay for actuating the individual program switches. The respective individual appliance functions may draw substantial current which is thus handled reliably and inexpensively by mechanical switches; and, The program logic, lodged in a microcomputer, need only control the switch latches. The hybrid controller of the present invention has been found particularly suitable for appliance applications having a main drive motor which draws substantial current with inductive reactance upon start up, and which would require prohibitively costly solid state switching devices to withstand the current surge.

DETAILED DESCRIPTION

Figure 1:
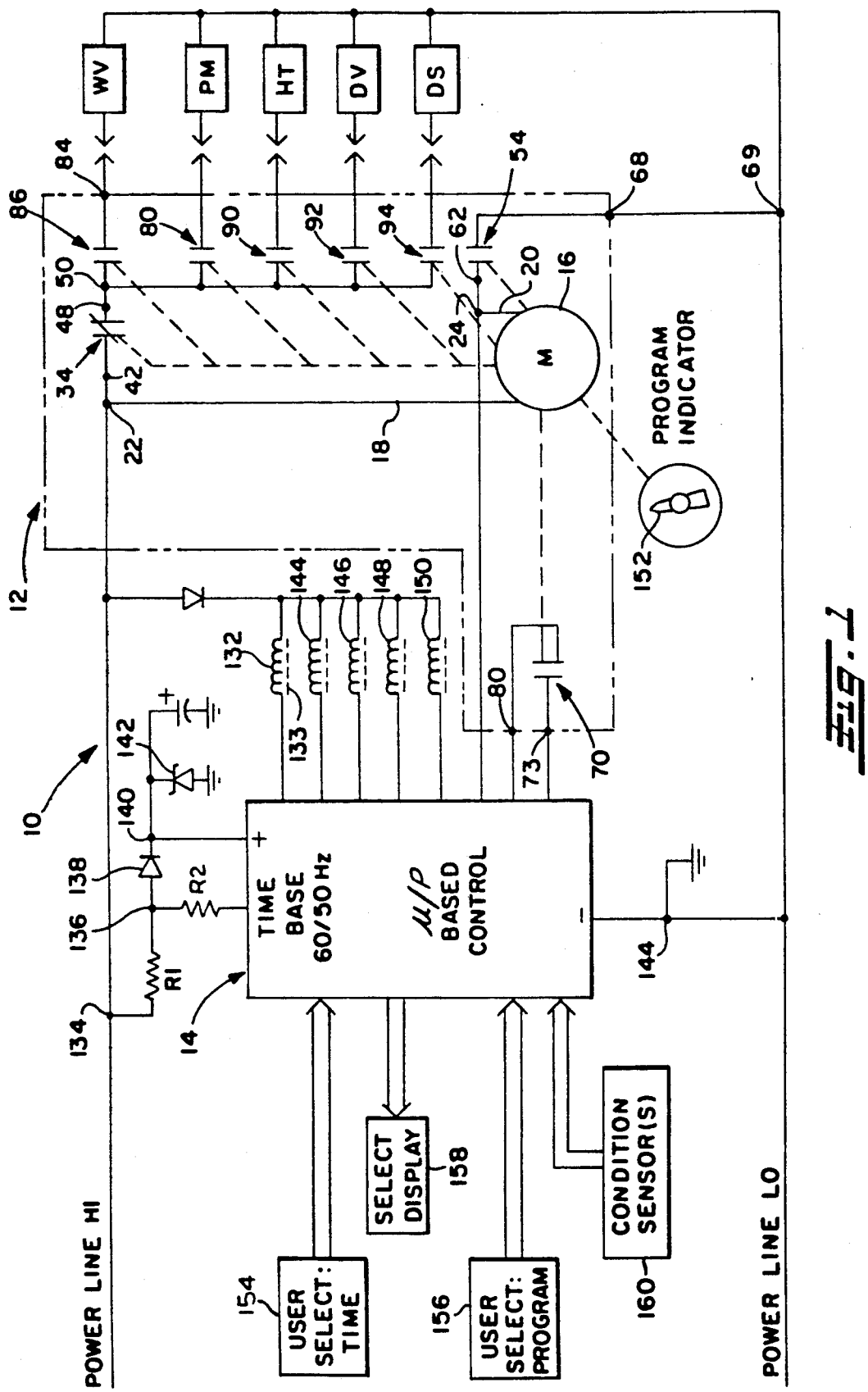
FIG. 1 is a somewhat schematic representation of the controller of the present invention.

Referring to FIG. 1, the controller of the present invention is indicated generally at 10, and comprises a motorized cam operated switching mechanism indicated generally at 12, and a microprocessor based control circuit indicated generally at 14.

Figure 2:
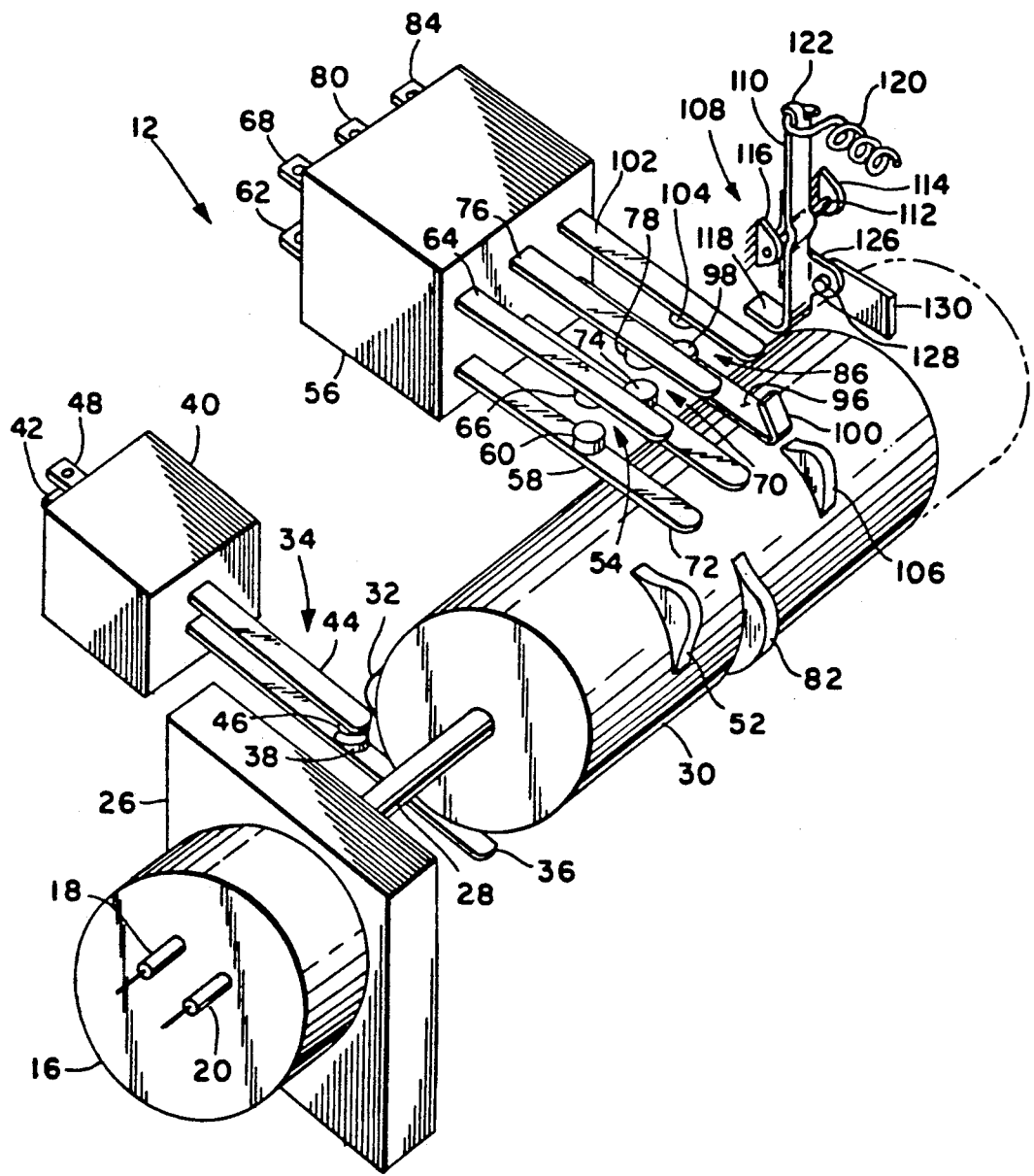
FIG. 2 is a somewhat perspective view of the mechanical elements of the programmer of the present invention.

Referring to FIGS. 1 and 2, the motorized switching mechanism 12 is shown in greater detail as comprising a timing motor 16 having connecting leads 18, 20 attached respectively to the power line through junction 22 and a control switch through junction 24. The motor 16 drives a suitable advance mechanism, preferably a speed reducer 26, which has an output shaft 28. Shaft 28 is connected to drive a cam drum 30, which has provided thereon a plurality of axially and circumferentially space cam lobes such as lobe 32. Although a motor and speed reducer is illustrated for the advance mechanism, other techniques such as a stepper motor and a solenoid stepping device may be employed. The cam drum is shown as having a portion thereof extended in dashed outline, which can have additional cam lobes provided thereon, as will be hereinafter described.

A power switch indicated generally at 34 has a movable, normally closed, contact blade 36 disposed to be contacted by cam lobe 32 upon rotation of drum 30; and, blade 36 has a contact 38 provided thereon. Blade 36 extends in cantilever from a terminal and insulator block 40; and, the blade 36 extends through the block and has a stationary portion 42 which is adapted for electrical connection thereto. Switch 34 also has an upper stationary contact blade 44 extending from the terminal block 40, with a second contact 46 provided thereon, which is disposed directly below and normally closed against the contact 38. Contact arm 44 has a tab portion 48 which extends through the terminal block 40, and which is adapted for connection thereto.

Switch 34 is a normally closed switch, and is series connected with a plurality of program switches through junctions 22 and 50 via electrical leads connected respectively to tabs 42 and 48.

Cam drum 30 has a control switch cam lobe 52 provided thereon which is spaced axially from the power switch lobe 32; and, control lobe 52 is displaced circumferentially as desired from the lobe 32.

A control switch indicated generally at 54 is disposed to be actuated by cam lobe 52. The switch 54 extends from terminal block 56 and has a lower contact blade arm 58, disposed for contact with cam lobe 52, and a contact 60 provided thereon for movement therewith. Blade arm 58 extends through mounting block 56 and has a tab 62 provided thereon which is adapted for electrical connection thereto. Switch 54 has an upper contact blade 64, which has an upper contact 66 provided thereon which is disposed directly above the lower contact 60 on blade 58. Upper contact blade 64 extends through terminal block 56, and has a tab or extension 68, which is adapted for electrical connection. In the presently preferred practice, with control switch 54 located on the opposite side of drum 30 from switch 34, lobe 52 is located diametrically opposite power lobe 32 such that power switch 34 and control switch 54 are actuated simultaneously.

Switch 54 is thus closed and opened by the passage of cam lobe 52 against the undersurface of blade 58. Control switch 54 has contact blade tab 62 connected to motor junction 24 and blade tab 68 connected to power line junction 69 on the opposite side of power line junction 22, and thus controls power to motor 16.

An index switch, indicated generally at 70, has a lower movable contact blade 72 extending from terminal block 56 with a contact 74 provided thereon, which is movable with the blade 72. The blade 72 also extends through terminal block 56, and has a tab 73 thereon (not shown in FIG. 2), illustrated schematically in FIG. 1, which is adapted for electrical connection thereto, as will be described herein. Switch 70 has an upper contact blade 76, which has a contact 78 provided thereon, which is disposed directly above the contact 74 for closure thereagainst. Upper contact blade 76 also extends through the terminal block 56 and has a tab or extension 80 thereon which is adapted for electrical connection thereto, as described below.

Cam drum 30 has an index switch lobe 82 provided thereon which is spaced axially from switch lobe 52, and is circumferentially offset from the lobe 52. With reference to FIG. 1, index switch 70 is series connected to an input terminal of the controller 14 at by a lead connected to terminal tab 80; and, the opposite side blade 72 of switch 70 is connected to another input of the controller 14 by a lead connected to tab 73.

Referring to FIGS. 1 and 2, a plurality of program switches is provided for controlling various appliance load functions such as those denoted with the designations WV, PM, HT, DV, and DS in FIG. 1. The load connection WV is connected through junction 84, and is connected through a program switch indicated generally at 86, which has one side thereof connected to power line junction 50. Each of the other appliance loads is similarly connected to junction 50 by a separate switch denoted by the general reference designations 88, 90, 92, and 94 respectively in FIG. 1.

Referring to FIG. 2, only one program switch 86 is illustrated for the sake of simplicity; and, switch 86 has a lower contact blade 96 extending from terminal block 56 and having a lower contact 98 provided thereon for movement therewith. The free end of contact arm 96 has a portion folded upwardly and somewhat back on itself, or more than a 90% bend, to form a cam surface 100 thereon. The opposite end of contact blade 96 extends through terminal block 56, and is adapted for electrical connection. Switch 86 has an upper contact blade 102 extending from terminal block 56 and the blade 102 extends through the terminal block to provide a tab 84 which is electrically connected to junction 50. Contact blade 102 has an upper electrical contact 104 disposed directly above lower contact 98 for closure thereagainst. Switch 86 has the extension of the lower contact blade 96 (not shown in FIG. 2) attached to junction 50 as shown schematically in FIG. 1.

Cam drum 30 has a plurality of program cam lobes provided thereon. One such lobe is illustrated typically, denoted 106, and is axially spaced from cam lobe 82 and circumferentially offset therefrom and located so as to contact the undersurface of the lower contact blade 96 of switch 86.

Upon rotation of cam drum 30, cam lobe 106 lifts blade 96 to close switch 86, for providing electrical current to the load function WV.

Referring to FIGS. 2 through 6, a latching mechanism, indicated generally at 108, has a latch member 110 pivotally mounted about shaft 112, which extends between stationary stanchions 114, 116. Latch member 110 has the lower end thereof formed preferably at right angles to the upper portion to form a hooked portion, as denoted by reference numeral 118, which portion is adapted for contacting the cam 100 of the lower contact blade 96 as will hereinafter be described in greater detail.

The latch member 110 is biased for movement by a spring 120, which has one end thereof hooked over a tab 122 provided at the upper end of the member 110. The opposite end of spring 120 is anchored over a stationary stanchion 124, as illustrated in FIGS. 3 through 6. The spring 120 thus biases the upper end of the member 110 to the right to provide a tendency toward clockwise movement about the pivot shaft 112, thereby urging the hook 118 on the lower end of member 110 in a direction toward the cam 100 provided on the switch contact blade 96.

A tab 126 is provided on the lower portion of member 110, intermediate shaft 112 and the hook 118; and, tab 126 has a pin 128 provided thereon which is attached to one end of an actuator rod 130 as, for example by a suitable clevis connection, one side of which is illustrated in FIG. 2. Rod 130 is connected to an electrical actuator (not shown in FIG. 2) as, for example, the armature 133 on a solenoid 132 (see FIG. 1).

Figure 3:
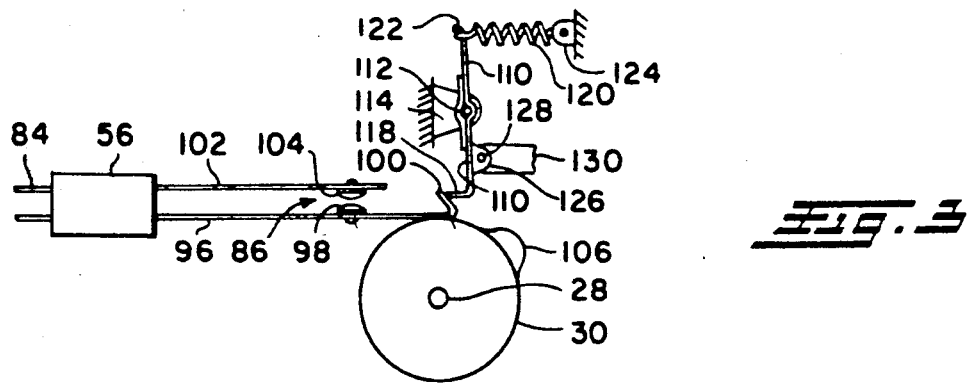
FIG. 3 is a view from the end of the cam drum, illustrating the operation of one of the switches and latch mechanism with the switch in the open position.

Referring to FIG. 3, the cam drum 30 is shown in a position where lobe 106 is located away from switch contact blade 96; and, in the position shown in FIG. 3, the spring 120 has biased latch member 110 counterclockwise such that the hook portion 118 rests against the cam surface 100 of the lower switch contact blade 96.

Figure 4:
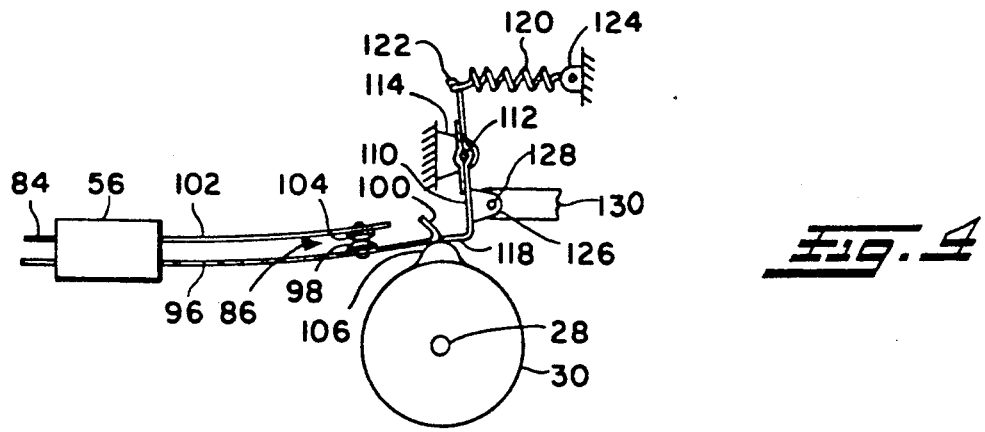
FIG. 4 is a view similar to FIG. 3, showing the cam rotated to close the switch contacts in the switch of FIG. 3.

Referring to FIG. 4, cam drum 30 has been rotated counterclockwise from the position shown in FIG. 3 to a position where cam lobe 106 is at the top dead center position; and, lobe 106 has raised the lower contact arm 96 upwardly thereby closing the contacts 98, 104 of switch 86. In the position of FIG. 4, the cam surface 100 has slidably deflected the latch member 110, causing it to rotate in a counterclockwise position, to a position where the tip of the hook 118 contacts the tip of the contact blade 96.

Figure 5:
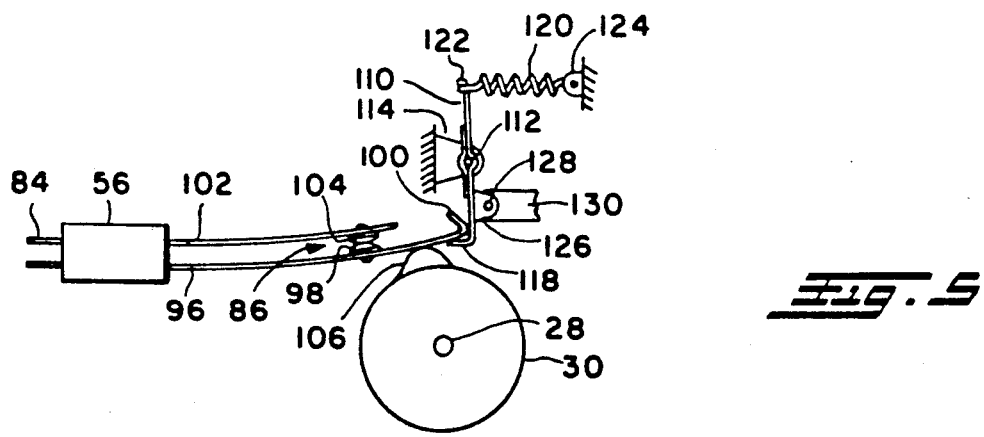
FIG. 5 is a view similar to FIG. 3, showing the cam rotated to a position to latch the switch closed; and, FIG. 6 is a view similar to FIG. 5, showing the cam rotated from the position shown in FIG. 5.

Referring to FIG. 5, cam drum 30 has been rotated an additional amount in a counterclockwise direction from the position shown in FIG. 4, wherein cam lobe 106 has moved to a position raising contact arm 96 and cam surface 100 to the maximum upward position. In the position of FIG. 5, latch member 110 is permitted to rotate a slight amount in a clockwise direction such that the lower hook portion 118 is secured under the end of contact arm 96 thereby latching switch 86 in the closed position.

Figure 6:
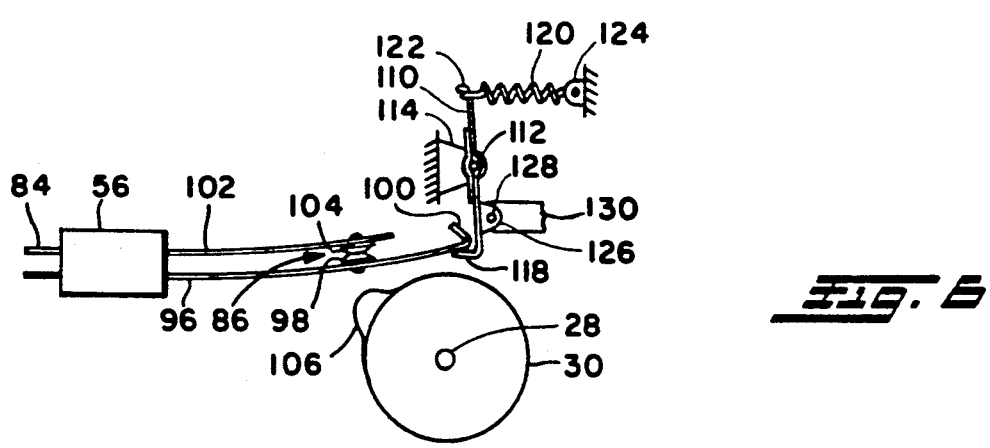

Referring to FIG. 6, cam drum 30 has rotated an additional amount in a counterclockwise direction from the position shown in FIG. 5 to illustrate the latched position of the switch 86 as unaffected by further cam rotation once latched.

Referring to FIG. 1, the microprocessor-based controller 14 receives a time-based signal through power line junction 134, a series current limiting resistor R1 connected to junction 136, and through a second current limiting resistor R2. The alternating current voltage at junction 136 is rectified by a diode 138, which is forward poled to junction 140, which is connected to a regulator, such as Zener diode 142; and, the voltage at junction 140 is connected to the supply voltage pin of the controller 14. The controller 14 is grounded through junction 144, which is connected to the opposite side of the power line, which is also connected to junction 80 and each of the lobes WV, EM, HT, DV, and DS.

Individual outputs of the microprocessor are connected respectively to separate solenoids, such as solenoid 132, for operating a latch such as through the armature 133 attached to connecting rod 130 (see FIG. 2) for unlatching individual program switches to perform the desired appliance functions. It will be understood that only one such program switch 86 has been illustrated in FIG. 2, and that additional switches are added to the terminal block 56, and additional lobes added to the cam drum in the region shown in dashed outline in FIG. 2. Such additional switches are denoted by the reference numerals 88, 90, 92, and 94 in FIG. 1, and each is operated respectively by one of the solenoids 144, 146, 148, and 150.

A program indicator comprising a dial knob with pointer 152 is employed, which is driven by a geared shaft from the cam drive, and which can be used to operate a rotating disk on the control panel for the appliance to indicate the function being performed, and/or the section of the program being executed. If desired, additionally the knob pointer 152 may have a dial indicating the time remaining to complete the program.

Referring to FIG. 1, a user select input for a desired program time interval is indicated by reference numeral 154, and may comprise a keypad or linear selector switch or rotary selector switch for providing a desired selected program time interval for the programmer 14. Additional user program selections, such as program input 156 may be provided to enable the user to select the order or sequence of programming of the appliance cycles, as indicated at reference numeral 156. If desired, an optional display 158 may be provided to indicate on the control panel the desired program time and sequence selections. The selections may be indicated by any convenient display, such as, for example, the microprocessor driving light-emitting diodes, lamps, or an alpha-numeric type display device.

The microprocessor-based controller 14 may also be programmed to respond to one or more condition sensors denoted by reference numeral 160, to provide override in the event of the occurrence of a specified condition, such as excessive water level.

In operation, the cam drum 30 rotates at a rate preferably in the range of one to two revolutions per second to enable rapid transition from one function to the next, e.g., to provide rapid resetting of any program switches which have been unlatched.

In the presently preferred practice of the invention, the initial conditions are with the cam rotated such that the cam lobe 32 is in the downward position, causing switch 34 to be in the open circuit condition, as are all other switches. Upon the user inducing a momentary shunt across switch 34 either by closing an auxiliary shunt switch or by rotating cam drum 30, the motor 16 is energized to drive the cam drum 30 through 360 degrees of rotation back to the home position. As the cam executes one complete revolution, it first opens the power switch 34, then latches the program switches, such as switch 86, which may be individually latched in sequence to minimize motor torque requirements, and then, as the lobe 82 approaches the switch blade 72, the momentary closure of switch 70 provides a signal to the microprocessor controller 14, thereby providing an indication of the position of the cam drum. At this point, the controller 14 momentarily unlatches the solenoids of the program switches not required for impending appliance functions.

The cam drum 30 completes its rotation and lobe 32 closes the switch 34 and breaks the closure of contacts 38, 46, thereby cutting off power to the motor 16, and stopping the cam in the home position.

After an appropriate time delay, or input from a condition sensor, the microprocessor controller 14 will start the cam operation cycle again, and leave the appropriate contacts latched for the next function to be performed.

Although a rotary cam has been described herein for actuating the switches, it will be understood that other mechanisms such as a solenoid actuated shaft or bar which would actuate all switches simultaneously may be employed. Additionally, latching of the switches could be accomplished by permanent magnets demagnetized by solenoids. Alternatively, solenoids operated at low current levels could be employed to engage the latches until the solenoid is de-energized.

The present invention thus provides a unique and novel programmable controller for an appliance using mechanical switches for reliably and inexpensively making and breaking circuits drawing substantial current for appliance functions. The controller of the present invention utilizes a latching mechanism for each of the program switches, responsive upon closure of the program switch by a cam drum, and the latching mechanism maintains the switch in the actuated position until such time as the solenoid is energized by a microprocessor-based controller to unlatch the switch and return the switch to the unactuated position. The present invention thus employs the reliability and heavy current handling capability of mechanically actuated switch contacts, yet provides the flexibility and sophistication of an electronically programmed controller for establishing the time and sequence of the actuation and deactuation of the individual switches for controlling the appliance program.

Although the invention has been described herein in the present practice with respect to the illustrated embodiments, it will be understood that the invention is capable of modification and variation, and is intended as limited only by the scope of the following claims.

I claim:

1. A programmable controller for an appliance comprising:
    (a) base structure adapted for attachment to an appliance to be controlled;
    (b) cam means mounted for cyclic movement on said base structure;
    (c) motor means operative upon energization to effect said cyclic movement;
    (d) a line power switch series connected with said motor means having a movable contact blade means disposed for movement by said cam means to effect opening and closing of said switch;
    (e) at least one program function switch having a movable contact blade means disposed for movement from an unactuated to an actuated condition by said cam means independently of said movement of said line power switch blade means;
    (f) latching means operative to maintain said program switch blade means in said actuated position;
    (g) actuator means operative upon electrical energization to release said latching means to enable said program switch blade means to return to the unactuated condition;
    (h) circuit means including microcomputer means connected to said actuator means and operable to selectively energize said actuator means in accordance with a selected program; and,
    (i) input means operable for user programming for said microprocessor.

2. The programmer of claim 1, wherein said cam means includes index means operable to signal the completion of a program to said microcomputer means.

3. The controller defined in claim 1, wherein said latching means includes a mechanical latch member engaging said program switch movable contact blade means.

4. The controller defined in claim 1, wherein said latching means includes a mechanical latch engaging said program switch movable contact blade and said release means includes a solenoid having the armature thereof operatively connected for affecting movement of said latch member.

5. The controller defined in claim 1, wherein said cam means includes a rotary cam drum with a plurality of cam tracks spaced axially thereon; and, a plurality of program switches, each disposed for actuation by one of said cam tracks.

6. The controller defined in claim 1, wherein said at least one switch comprises a plurality of program switches; and, further comprising a power switch series connected to each of said program switches.

7. The controller defined in claim 1, wherein said motor means comprise a stepper motor and said cam means comprises a rotary cam drum driven by said stepper motor.

8. The controller defined in claim 1, further comprising index means including a separate index cam on said cam means, and a separate index switch actuated by said index cam once each cycle of said cam means, wherein said index switch is connected to provide a signal to said circuit means.

9. The controller defined in claim 1, wherein said live power switch is a normally closed single-pole single-throw switch and is opened only when said cam means is in a designated reference position in its cycle.

10. The controller defined in claim 1, further comprising a control switch electrically in series with each of said at least one program switch, said control switch responsive to said cam means to be closed only when said cam means is in a designated reference position.

11. A method of controlling the sequence of operation of a plurality of electrical switches for appliance program functions comprising the steps of:
    (a) providing a plurality of switches for said program functions each having a movable member for affecting actuation and deactuation thereof;
    (b) moving each of said members to the actuated positions;
    (c) latching each of said members in the actuated position; and,
    (d) selectively releasing said latching in electrically programmed sequence independently of said moving; and,
    (e) biasing said member for deactuation.

12. The method defined in claim 11, wherein said step of releasing includes the steps of responding to a programmed sequence, energizing a solenoid and moving a latch member.

13. The method defined in claim 12, wherein said steps of latching includes the step of biasing a latch member and engaging said switch movable member.

* * * * *